(12) United States Patent
Liu et al.

(10) Patent No.: US 10,885,306 B2
(45) Date of Patent: Jan. 5, 2021

(54) LIVING BODY DETECTION METHOD, SYSTEM AND NON-TRANSITORY COMPUTER-READABLE RECORDING MEDIUM

(71) Applicant: BEIJING KUANGSHI TECHNOLOGY CO., LTD., Beijing (CN)

(72) Inventors: Haimin Liu, Beijing (CN); Junjie Long, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/212,410

(22) Filed: Dec. 6, 2018

(65) Prior Publication Data
US 2020/0005019 A1    Jan. 2, 2020

(30) Foreign Application Priority Data
Jun. 28, 2018 (CN) .......................... 2018 1 0706117

(51) Int. Cl.
*G06K 9/00* (2006.01)
*G06F 21/32* (2013.01)

(52) U.S. Cl.
CPC .......... *G06K 9/00114* (2013.01); *G06F 21/32* (2013.01); *G06K 9/0012* (2013.01); *G06F 2221/2113* (2013.01)

(58) Field of Classification Search
None
See application file for complete search history.

(56) References Cited

U.S. PATENT DOCUMENTS 9,633,322 B1 *   4/2017   Burger ............... G06Q 10/0635
2004/0148526 A1   7/2004   Sands et al.
(Continued)

FOREIGN PATENT DOCUMENTS

JP    2013114283 A    6/2013
JP    2016062457 A    4/2016
(Continued)

OTHER PUBLICATIONS

Extended European Search Report for Application No. 18210932.2, dated Jun. 4, 2019.

*Primary Examiner* — Nicholas J Lee
(74) *Attorney, Agent, or Firm* — Marshall, Gerstein & Borun LLP

(57) ABSTRACT

There are provided in embodiments of the present disclosure a living body detection method, system and a non-transitory computer-readable recording medium. The living body detection method includes: acquiring device information of a terminal used to acquire an image of an object to be detected; determining a device risk level of the terminal; determining a living body detection strategy based on the device risk level of the terminal. The above technical solution adjusts the living body detection strategy by utilizing the device information of the terminal, which guarantee a true living body to go through a pass of the detection at a smaller cost, and at the same time makes it difficult for a false and malicious living body to go through a pass of the detection, thereby greatly reducing security risk of the living body detection, enhancing the user experience, and preventing the malicious request from occupying the system resources.

15 Claims, 4 Drawing Sheets

S210 — acquiring device information of a terminal

S220 — determining a device risk level of the terminal by utilizing the device information of the terminal S230 — determining a living body detection strategy based on the device risk level of the terminal

(56) References Cited

U.S. PATENT DOCUMENTS

| | | | |
|---|---|---|---|
| 2008/0312998 A1* | 12/2008 | Templeton | G06Q 10/0635 705/7.28 |
| 2013/0104203 A1 | 4/2013 | Davis et al. | |
| 2013/0298192 A1* | 11/2013 | Kumar | G06F 21/52 726/3 |
| 2014/0137191 A1 | 5/2014 | Goldsmith et al. | |
| 2014/0283061 A1* | 9/2014 | Quinlan | H04L 63/1408 726/23 |
| 2014/0289116 A1 | 9/2014 | Polivanyi | |
| 2017/0109509 A1* | 4/2017 | Baghdasaryan | G06Q 20/40 |
| 2018/0041503 A1 | 2/2018 | Lindemann | |
| 2019/0386972 A1* | 12/2019 | Boutnaru | G06Q 20/4016 |

FOREIGN PATENT DOCUMENTS

| | | |
|---|---|---|
| KR | 10-2012-0108264 A | 10/2012 |
| KR | 10-2017-0037486 A | 4/2017 |
| KR | 101860314 B1 | 5/2018 |
| WO | WO-2016178789 A1 | 11/2016 |

\* cited by examiner

100

LIVING BODY DETECTION METHOD, SYSTEM AND NON-TRANSITORY COMPUTER-READABLE RECORDING MEDIUM

CROSS-REFERENCE TO RELATED APPLICATION

The present application claims the priority of Chinese Patent Application No. 201810706117.X filed on Jun. 28, 2018, the disclosure of which is incorporated herein by reference in its entirety.

TECHNICAL FIELD

The present disclosure relates to a technical field of image processing, in particular relating to a living body detection method, system and a non-transitory computer-readable recording medium.

BACKGROUND

With the development of science and technology as well as increase of level of automation, a variety of application systems such as a biological recognition system is required to have the function of living body detection, i.e., determining whether a user is a living individual.

A general living body detection technique utilizes physiological characteristics of human beings. For example, detection of fingerprints of a living body can be based on information such as temperature, perspiration of fingers, and electrical conductivity of fingers. Detection of human face of the living body can be based on information such as breathing, infrared effects, etc. Detection of iris of the living body can be based on iris vibration characteristic, movement information of eyelashes and eyelids, contraction and expansion response characteristics of pupils to intensity of visible light sources, etc. These living body detection techniques depend on sensor technology for detecting physiological characteristics of human beings. These techniques are difficult to ensure accuracy of living body detection, and cannot effectively prevent a malicious living body from attacking the system either.

SUMMARY

In view of the above problems, the present disclosure is proposed. There are provided in the present disclosure a living body detection method, apparatus, system and a non-transitory recording medium.

According to an embodiment of the present disclosure, there is provided a living body detection method, comprising: acquiring device information of a terminal, wherein the terminal is used to acquire an image of an object to be detected; determining a device risk level of the terminal by utilizing the device information of the terminal; and determining a living body detection strategy based on the device risk level of the terminal.

According to another embodiment of the present disclosure, there is further provided a system for living body detection, comprising a processor and a storage, wherein a computer program instruction is stored in the storage, and the computer program instruction is used to perform the living body detection method as described above when being ran by the processor.

According to another embodiment of the present disclosure, there is further provided a non-transitory computer-readable recording medium, on which a computer program is stored, wherein the computer program is used to perform the living body detection method as described above when being ran.

The living body detection method, apparatus, system and non-transitory recording medium according to the embodiments of the present disclosure adjust the living body detection strategy by utilizing the device information of the terminal, which guarantee a true living body to go through a pass of the detection at a smaller cost, and at the same time makes it difficult for a false and malicious living body to go through a pass of the detection, thereby greatly reducing security risk of the living body detection, enhancing the user experience is enhanced, and prevent the malicious request from occupying system resources.

The above descriptions are just a summary of technical solutions of the present disclosure. In order to know technical measures of the present disclosure more clearly and implement the present disclosure according to the content of the specification, and in order to make the above and other purposes, characteristics and advantages of the present disclosure more evident and easier to be understood, specific implementations of the present disclosure are given below specifically.

BRIEF DESCRIPTION OF THE DRAWINGS

Embodiments of the present disclosure will be described in detail by combining with accompanying figures, and the above and other purposes, features and advantages of the present disclosure will become more evident. The accompanying figures are used to provide further understanding of the embodiments of the present disclosure, form a part of the specification, and are used to explain the present disclosure together with the embodiments of the present disclosure, but do not form a limitation to the present disclosure. In the accompanying figures, the same reference marks generally represent the same components or steps.

DETAILED DESCRIPTION

In order to make purposes, technical solutions and advantages of the present disclosure more evident, exemplary embodiments according to the present disclosure will be described in detail by referring to the accompanying figures. Obviously, the embodiments described below are a part of embodiments of the present disclosure, but not all the embodiments of the present disclosure. It shall be understood that the present disclosure is not limited to exemplary embodiments described herein. Based on the embodiments of the present disclosure described in the present disclosure, all the other embodiments obtained by those skilled in the art without paying any inventive labor shall fall into the protection scope of the present disclosure.

Figure 1:
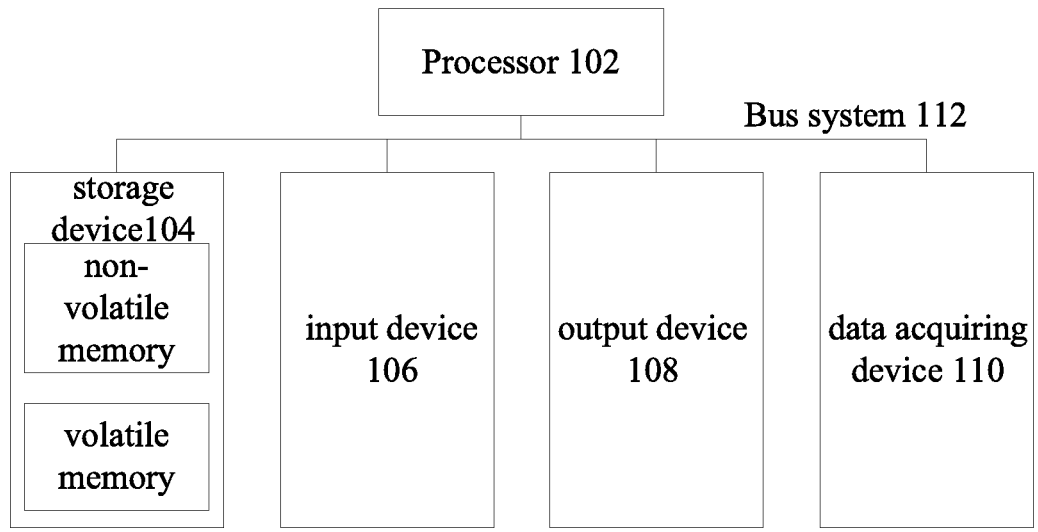
FIG. 1 shows a schematic block diagram of an exemplary electronic device used to implement a living body detection method and apparatus according to an embodiment of the present disclosure.

First, an exemplary electronic device 100 used for implementing a living body detection method and apparatus according to an embodiment of the present disclosure is described by referring to FIG. 1.

As shown in FIG. 1, the electronic device 100 comprises one or more processors 102, one or more storage devices 104. Optionally, the electronic device 100 can further comprise an input device 106, an output device 108 and a data acquiring device 110. These components are connected to each other via a bus system 112 and/or other forms of connection mechanisms (nor shown). It shall be noted that components and structures of the electronic device 100 as shown in FIG. 1 are just for illustration, but not for limitation. According to the requirement, the electronic device can have other components and structures.

The processor 102 can be a central processing unit (CPU), a graphic processing unit (GPU) or other forms of processing units having data processing capability and/or instruction executing capability, and can control other components in the electronic device 100 to execute desired functions.

The storage device 104 can comprise one or more computer program products. The computer program product can comprise various forms of computer readable storage medium, for example, a volatile memory and/or a non-volatile memory. The volatile memory can comprise for example a random access memory (RAM) and/or a cache memory (cache) etc. The non-volatile memory can comprise for example a read-only-memory (ROM), a hard disk and a flash memory, etc. One or more computer program instructions can be stored on the computer readable storage medium, and the processor 102 can run the program instructions, so as to realize client functions and/or other desired functions (realized by the processor) in the embodiments of the present disclosure described below. A diversified of application programs and data can be stored in the computer readable storage medium, for example, various data used and/or produced by the application programs.

The input device 106 can be a device used by a user to input instructions, and can comprise one or more of keyboard, cursor mouse, and microphone and touch screen.

The output device 108 can output various information (for example, image and/or sound) to the outside (for example, a user), and can comprise one or more of a display and a loudspeaker.

The data acquiring apparatus 110 can collect various forms of data such as images, and store the collected data in the storage device 104 to be used by other components. The data acquiring device 110 may be a camera, etc. It shall be understood that the data acquiring device 110 is just for illustration, and the electronic device 100 may not comprise the data acquiring device 110. In this case, data can be acquired by utilizing other data acquiring devices, and the acquired data would be transmitted to the electronic device 100.

Exemplarily, an exemplary electronic device used to implement the living body detection method and apparatus according to the embodiment of the present disclosure can be implemented at a device such as a mobile phone, a tablet computer, a customized terminal, a personal computer or a remote server, etc.

Figure 2:
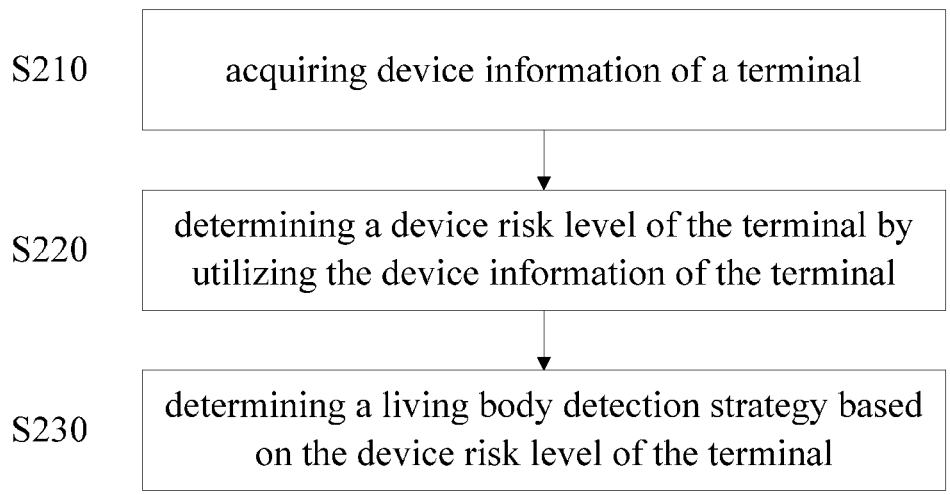
FIG. 2 shows a schematic flow diagram of a living body detection method according to an embodiment of the present disclosure.

FIG. 2 shows a schematic flow diagram of a living body detection method 200 according to an embodiment of the present disclosure. As shown in FIG. 2, the method 200 comprises the following step:

Step S210, acquiring device information of a terminal, wherein the terminal is used to acquire an image of an object to be detected.

The object to be detected can initiate a living body detection request through the terminal. The terminal may be a terminal device such as a mobile phone, a tablet computer, a customized terminal, or the like, or may be various terminals simulated through a software. The device information is information on the device, for example, a device identification used to uniquely identify the terminal, characteristic parameters used to detect that the terminal is a real device, and so on and so forth.

In one example, living body detection Software Development Kit (SDK) is initialized at the terminal, wherein the living body detection SDK is a software development kit for the living body detection function. The device information of the terminal can be collected in the process of initiating the living body detection SDK.

In another example, the living body detection APP is installed at the terminal, and the device information of the terminal can be collected in the process of starting up the living body detection APP.

The terminal is further used to acquire an image of an object to be detected. For example, a picture and/or a video image of the object to be detected can be acquired by a device such as a camera, so as to be used for living body detection.

Step S220, determining a device risk level of the terminal by utilizing the device information of the terminal acquired in step S210.

After the device information of the terminal is acquired, device risk level estimation is performed on the terminal based on the device information. It is determined that the device risk level of the terminal is a high risk level if the device information has a high risk identifying characteristic; it is determined that the device risk level of the terminal is a risk level if the device information has a general risk identifying characteristic; otherwise, the device is a normal device. In one embodiment, the object to be detected initiates a living body detection request at a terminal (for example, a terminal device such as a mobile phone, a tablet computer, a customized terminal or a virtual machine, and so on), a server side (for example, a remote computer or a cloud server) receives the device information of the terminal, and the device risk level of the terminal is determined according to the device information of the terminal. In another embodiment, the object to be detected initiates the living body detection request at the terminal, and the terminal determines the device risk level of the terminal according to the collected device information of the current terminal.

By performing graded evaluation on the device risk level of the terminal, specialized processing can be performed on the living body detection request of the terminal at different risk levels, so as to enhance system efficiency and user experience.

Step S230, determining a living body detection strategy based on the device risk level of the terminal determined in step S220.

Based on the device risk level of the terminal that initiates the living body detection request, it can be evaluated that the present living body detection request belongs to a risk level of a malicious attack request. Thus, the living body detection strategy can be determined with respect to different device risk levels, for example, directly rejecting the malicious request, randomly raising the threshold for the living body detection operation with respect to a suspicious evil request and randomly reducing the threshold for the living body detection operation with respect to a normal operation.

Directly refusing the evil request can shield the high risk, and at the same time avoids from occupying the system resources. Raising the threshold for the living body detection operation increases the difficulty for a possible malicious request to go through a pass of the detection. In the meantime, the random requirement for the living body detection operation reduces predictability of the living body detection operation, so that the difficulty for the malicious request to go through a pass of the detection is further enhanced. Randomly reducing the threshold for the living body detection operation with respect to the normal request increases the normal request's efficiency in going through a pass, and at the same time raises the user experience.

By utilizing the device information of the terminal that initiates the living body detection request, the living body detection strategy is adjusted, which guarantees a real living body to go through a pass at a smaller cost, and at the same time makes it difficult for a false and malicious living body to go through a pass. In this way, accuracy of the living body detection is guaranteed, thereby greatly reducing the security risk of the living body detection, and at the same time, preventing the evil request from occupying the system resources.

Figure 3:
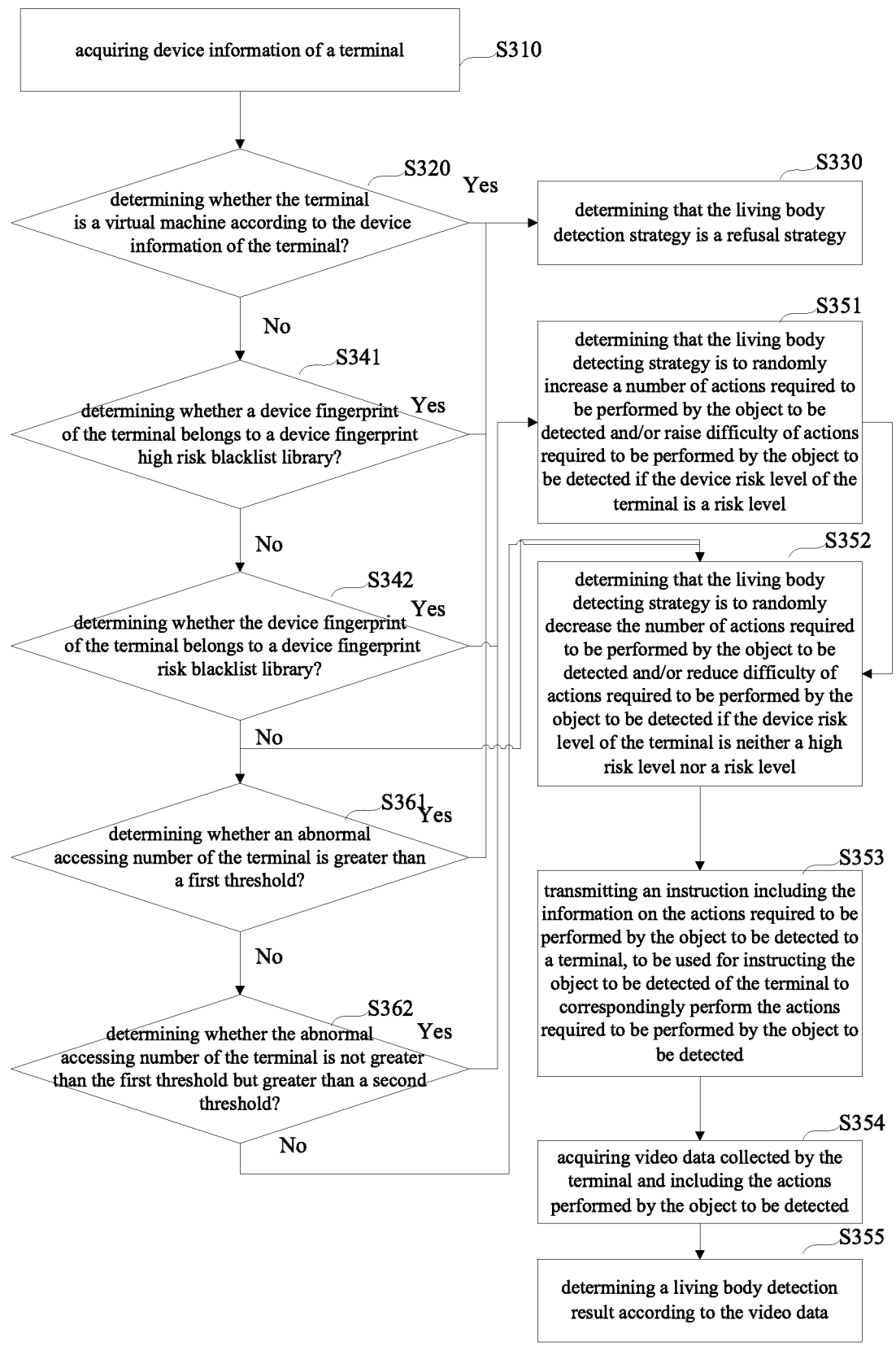
FIG. 3 shows a schematic flow diagram of a living body detection method according to another embodiment of the present disclosure.

FIG. 3 shows a schematic flow diagram of a living body detection method 300 according to another embodiment of the present disclosure. As shown in FIG. 3, functions, processing methods and processes implemented by a step S310 in the method 300 are similar to those implemented by the step S210 in the method 200, and thus no further details are given herein. Step S320, step S341, step S342, step S361 and step S362 in the method 300 are more specific implementations of the step S220 in the method 200. Step S330 and steps S351 to S355 in the method 300 are more specific implementations of the step S230 in the method 200.

In step S320, determining whether the terminal is a virtual machine by utilizing the device information of the terminal obtained in step S310. The virtual machine is a terminal simulated by a software, such as a virtual mobile phone terminal. The device risk level of the virtual machine is a high risk level, and is a measure conventionally used by a malicious attack request. User data such as user picture, user account data and so on in the process of real using is intercepted and captured through a Hacker, or the like. Then, the intercepted and captured user data is used by utilizing the virtual machine to pretend a real user to initiate a living body detection request. The user that initiates a malicious request through the virtual machine is not a really existed living body, and also called as a false living body.

Exemplarily, the device information used to determine whether the terminal is a virtual machine can comprise device fingerprint of the terminal. Like that fingerprint of human beings has the characteristic of uniqueness and thus can be taken as an identity of human beings, a real hardware terminal also has a device identity that can be used to uniquely identify the terminal, which is called as the device fingerprint of the terminal. The device fingerprint of the terminal may be for example a hardware serial number such as a CPU hardware IMEI code of the terminal, or may be a device identity such as International Mobile Equipment Identity (IMEI) and Medium Access Control address (MAC), or the like. If the terminal initiating a request is a terminal of a real user, then the device fingerprint of the terminal is a determined unique specific value. If the terminal initiating a request is a virtual machine simulated by a software, then the obtained device fingerprint of the terminal such as information on IMEI and so on is usually 0. Therefore, it can be detected whether the terminal is a virtual machine by determining whether the device fingerprint of the terminal is a unique specific value or not.

Exemplarily, the device information used to determine whether the terminal is a virtual machine can further comprise information on device electric energy of the terminal. For a normal terminal device, in the process of using, the information on electric energy is constantly changing, while the electric energy of the virtual machine simulated by a software remains unchanged. Therefore, it can be detected whether the terminal is a virtual terminal by determining whether the information on device electric energy of the terminal always remains unchanged or not.

Exemplarily, the device information used to determine whether the terminal is a virtual machine can further comprise information on device sensor of the terminal. A common terminal, for example, a mobile phone, is always embedded with a plurality of device sensors, such as a gyroscope sensor, a gravity sensor, an acceleration sensor and a magnetic sensor, or the like. As the mobile phone moves, the information on the device sensor also changes. For example, the gyroscope sensor can track displacement changes in a plurality of directions, the gravity sensor can track the gravity changes, the acceleration sensor can measure the movement speed of the mobile phone, and the magnetic sensor can detect magnetic density and direction change and so on, while the information on device sensor of the virtual machine simulated by the software would maintain unchanged. Therefore, it can be detected whether the terminal is a virtual machine by determining whether the information on device sensor of the terminal always maintains unchanged or not.

By utilizing the above various device information of the terminal, it can be detected whether the terminal is a device such as the virtual machine whose device risk level is a high risk level, so as to exclude the malicious attack request initialized by means of the virtual machine.

Step S330, determining that the living body detection strategy with respect to the terminal is a refusal strategy if the device risk level of the terminal determined in step S320 is the high risk level. For example, if it is considered that a non-living body initializes a request by using the virtual machine, then the malicious request of the terminal is refused directly, thereby shielding the security risk, and preventing malicious request from occupying the system resource effectively.

The method 300 further comprises steps S341 and S342. The device information of the terminal comprises the device fingerprint of the terminal, and the device risk level of the terminal is determined by utilizing the device fingerprint of the terminal and the device fingerprint blacklist library.

In various applications of the living body identification, such as network identification, network payment certification, security access control system, etc., various suspicious behaviors would reduce creditability of the terminal. The device fingerprints of the terminal initiating an operation are added to various ranks of blacklist libraries according to the creditability records respectively. In the present embodiment, the device fingerprint blacklist libraries are divided into two ranks according to degree of risk: device fingerprint high risk blacklist library and device fingerprint risk blacklist library. Herein, the device fingerprint high risk blacklist library can comprise blacklists issued by the Ministry of Public Security and global shared blacklists, and can further comprise device fingerprint blacklists that have initiated malicious attack behaviors in the actual application. The device fingerprint risk blacklist library can comprise device fingerprint blacklists that have initiated suspicious attack behaviors in the actual application.

Step S341, determining that the device risk level of the terminal is a high risk level if the device fingerprint of the terminal belongs to the device fingerprint high risk blacklist library. The terminal is likely to have initiated a malicious attack behavior, or have been listed explicitly into high risk blacklists by the Ministry of Public Security or the public. That is, it is likely to be a bad person having a malicious attack motivation who uses the terminal to initiate a request. The step S330 is continuously performed, i.e., determining that the living body detection strategy with respect to the terminal is a refusal strategy, for example, directly rejecting the request of the terminal, thereby shielding the security risk and at the same time effectively preventing the malicious request from occupying the system resources.

In step S342, determining that the device risk level of the terminal is a risk level if the device fingerprint of the terminal belongs to the device fingerprint risk blacklist library. This terminal is likely to initiate suspicious attack behaviors or other behaviors affecting creditability.

The method 300 further comprises a step S351. As for the case that the device risk level of the terminal is the risk level, in order to reduce the security risk, the step S351 is continuously performed, i.e., determining that the living body detection strategy with respect to the terminal is to randomly increase the number of actions required to be performed by the user and/or raise the difficulty of the actions required to be performed by the user. For example, the user is normally required to wink for two times, and then the user would be required to wink for four times. Normally, the user is required to only perform the actions of winking or opening mouth, and then the difficulty of the actions can be raised as touching his/her nose with the right hand. Also, the number of actions and the difficulty of actions required to be performed by the user can be randomly combined, for example, requiring the user to wink for four times and open mouth for three times, or requiring the user to wink for three times and touch his/her nose with the right hand for two times, or requiring the user to open his/her mouth for two times and touch the nose with the left hand for three times, and so on and so forth.

Exemplarily, the method 300 further comprises a step S353, a step S354 and a step S355, determining a living body detection result by utilizing the images of the object to be detected that are collected by the terminal.

Step S353, transmitting an instruction including the information on the actions required to be performed by the object to be detected to a corresponding terminal, to be used for instructing the object to be detected of the terminal to correspondingly perform the above actions required to be performed by the object to be detected, for example, transmitting the following instruction: please wink→please open mouth→please wink→please open mouth→please open mouth. The object to be detected performs a corresponding action according to the above instruction.

Step S354, acquiring a video image collected by the terminal and including the actions performed by the object to be detected.

Step S355, determining a living body detection result according to the acquired video image. For example, if the actions performed by the object to be detected in the video image match with the actions required to be performed by the object to be detected, then the living body detection result of the object to be detected is going through a pass of detection; otherwise, the living body detection result is t not going through a pass of detection. In one example, the object to be detected initiates a living body detection request at the terminal, and a server side transmits the above instruction to the corresponding terminal, to instruct the object to be detected to perform the living body detection operation. This terminal collects the video image including the actions performed by the object to be detected and transmits the video image to the server side. The server side determines the living body detection result according to the acquired video image.

In another embodiment, the object to be detected initiates the living body detection request at the terminal, the terminal directly sends the above instruction to instruct the object to be detected to perform the living body detection operation, and determines the living body detection result according to the collected video image.

By increasing the number of the actions required to be performed by the object to be detected and/or raising the difficulty of the actions required to be performed by the object to be detected, the difficulty in going through a pass of the detection is raised for a potential malicious request. At the same time, a random requirement for the living body detection operation reduces predictability of the living body detection operation, and further enhances the difficulty in going through a pass of the detection for a malicious request. In this way, for the case that the device risk level of the terminal is a risk level, the threshold for the living body detection operation is increased, and the security risk of the living body detection is reduced.

Exemplarily, the method 300 further comprises a step S361 and a step S362. The device information of the terminal comprises information on an abnormal accessing number of the terminal, and the device risk level of the terminal is determined by utilizing this information. Some malicious attacks would initiate requests constantly, and try to go through a pass of the detection or make an attacked system too busy to make a response to a normal request or even make the system break down. There may be also bad persons who put up a mask in order to go through a pass of the living body detection. For a new user, since he/she is unfamiliar with how to use, it is possible to initiate multiple times of repeated requests. The above information includes the record of requesting to access initiated frequently within a specific period of time. Depending on this record, the number of abnormal accessing initiated frequently by a same terminal within a specific period of time can be obtained. Herein, the specific period of time can use default settings, for example, one day or one hour, and also the administrator of the living body detection can modify these settings.

Step S361, determining that the device risk level of the terminal is the high risk level if the abnormal accessing number of the terminal is greater than a first threshold. Requests initiated by the terminal frequently is very likely to be a malicious attack with a high risk. The step S330 is continuously performed, i.e., determining that the living body detection strategy for the terminal is the refusal strategy, for example, directly refusing the request of the terminal, thus shielding the security risk, and at the same time effectively preventing the malicious request from occupying the system resource. Herein, the first threshold is a high risk threshold, and can use the fault settings, for example, 1000 times, and also the administrator of the living body detection can modify the first threshold.

Step S362, determining that the device risk level of the terminal is the risk level if the abnormal accessing number of the terminal is not greater than the first threshold but greater than a second threshold. The user using the terminal is likely to be a bad person which puts up a mask in order to go through a pass or a new user who is unfamiliar with how to operate, or other situations. In order to reduce the security risk, the step S351 is continuously performed, i.e., determining that the living body detection strategy for the terminal is to randomly increase the number of the actions required to be performed by the object to be detected and/or raise the difficulty of the actions required to be performed by the object to be detected. Specific processes of the living body detection operations are described in previous steps S353 to S355. For the purpose of simplicity, no further details are given herein. Herein, the second threshold is a general risk threshold, and can use the default settings, for example, 100 times, and the administrator of the living body detection can modify the second threshold.

The method 300 further comprises step S352. For the case that the device risk level of the terminal is neither the high risk level nor the risk level, that is, the terminal is a normal terminal with a low risk level. The step S352 is performed, i.e., determining that the living body detection strategy for the terminal is to randomly decrease the number of the actions required to be performed by the object to be detected and/or reduce the difficulty of the actions to be performed by the object to be detected. For example, the object to be detected is normally required to wink for two times and open his/her mouth for two times, then the object would be required to wink for only one time or open his/her mouth for only one time, or even does not need to perform any action, and so on and so forth. By decreasing the number of the actions required to be performed by the object to be detected and/or reducing the difficulty of the actions required to be performed by the object to be detected, the threshold for the living body detection operations is reduced, so that the efficiency in going through a pass of a normal request is enhanced, and at the same time the user experience is improved. For example, as for an entrance control by brushing a face/an attendance machine used by a company having 1000 employees, if each employee has to wink for two times and open his/her mouth for two times so as to go through a pass of a verification of living body brushing a face, the time for each employee to complete the above operation of verification of living body brushing face is 20 seconds. During the morning rush hours at work, since each employee is able to enter into the company after waiting for completion of the operation of verification of living body brushing face, a situation that a plurality of employees crow at the door of the company to wait for entry into the company would occur. According to the embodiment of the present disclosure, a terminal used by a normal employee is detected as a normal terminal with a low risk level, and then the system randomly decreases the number of the actions required to be performed by the object to be detected and/or reduce the difficulty of the actions required to be performed by the object to be detected. The operation of verification of living body brushing a face for each employee to enter into the company is to wink for only one time or open his/her mouth for only one time. For a user in a device fingerprint whitelist, if an employee uses a same mobile phone for a long period of time stably, he/she does not need to perform any action. Therefore, time on completing the operation of verification of living body brushing body does not exceed three seconds, thereby improving the efficiency in going through a pass of verification of living body brushing face for normal employees (i.e., real living bodies) greatly, so that the user experience is enhanced from the standpoint of company managements or from the viewpoint of an individual employee. On the other hand, a random requirement for the living body detection operation, for example, requiring to wink last time, being likely to require opening mouth next time, or being likely to require performing no action next time, can bring small changes and surprises to the "boring" entrance control/attendance brushing face operation of the normal employees, so as to further enhance the user experience. At the same time, the random requirement for the living body detection operation reduces predictability of the living body detection operation and raises the difficulty of going through a pass of the detection for potential malicious requests. By taking the behavior of stealing a mobile phone of an employee and using a picture of the employee to perform verification of brushing a face as an example, since the action required by the living body detection operation cannot be expected, a video of a corresponding action cannot be prepared in advance, and thus the living body detection cannot be passed to a large extent, thereby reducing the security risk. The specific processes of the living body detection operation are described in previous steps S353 to S355. For the purpose of briefness, no further details are given herein.

Steps of S310 to S362 in the above embodiment give a method for performing living body detection by utilizing the device information of the terminal. Those skilled in the art can understand that the above steps are just for illustration, but not for limitation. As shown in FIG. 3, the step S320 of determining a virtual machine is performed, i.e., determining whether a terminal is a virtual machine based on a device fingerprint of the terminal. If the terminal is not a virtual terminal, then the steps S341 and S342 of searching a blacklist are performed, to further search whether the device fingerprint belongs to the device fingerprint high risk blacklist library or the device fingerprint risk blacklist library. If the device fingerprint does not belong to any one of the above black libraries, then the steps S361 and S362 of determining abnormal accessing are performed, to further check whether the terminal has any information on abnormal accessing, so as to determine the device risk level of the terminal accurately. Optionally, the above three methods of determining do not have to be performed one by one in sequence. For example, the step S320 of determining the virtual machine can be skipped, i.e., directly performing the steps S341 and S342 of searching the blacklist. For another example, after the step S320 of determining the virtual machine is performed, the steps S341 and S342 of searching the blacklist may not be performed, i.e., directly performing the step S361 and S362 of determining abnormal accessing. For another example, only the step S361 and S362 of determining abnormal accessing are performed. Optionally, sequence of performing the above three determining methods can be exchanged. For example, after the step S320 of determining the virtual machine is performed, the steps S361 and S362 of determining abnormal accessing are firstly performed, and then steps S341 and S342 of searching the blacklist are performed. Optionally, the above three determining methods can be performed in parallel. According to the actual application scenario and the system resources, the above various determining methods are combined and applied flexibly, to obtain a comprehensive preferable technical solution with effect, efficiency and cost.

In the above embodiment, the living body detection request is initiated through the terminal. Those ordinary skilled in the art can understand that a server side, for example, a remote computer or a cloud server, can voluntarily initiate a living body detection instruction to a terminal of an object to be detected that needs to perform detection. After the terminal receives the living body detection instruction, the device information of the current terminal is collected so as to perform subsequent steps of the living body detection method. The technical solutions of the present application do not limit thereto.

Figure 5:
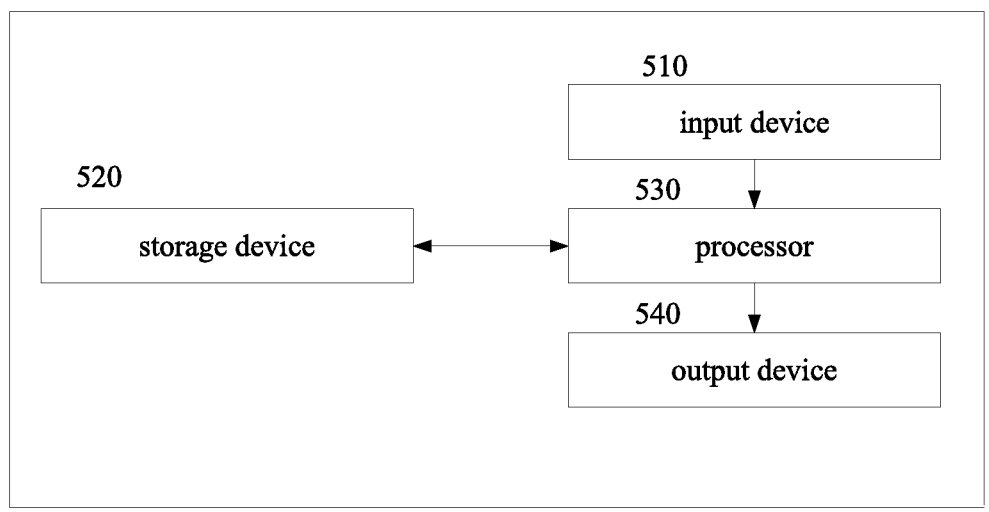
FIG. 5 shows a schematic block diagram of a system used for living body detection according to one embodiment of the present disclosure.

According to another embodiment of the present disclosure, there is further provided an apparatus for living body detection. FIG. 5 shows a schematic block diagram of an apparatus for living body detection according to an embodiment of the present disclosure.

Figure 4:
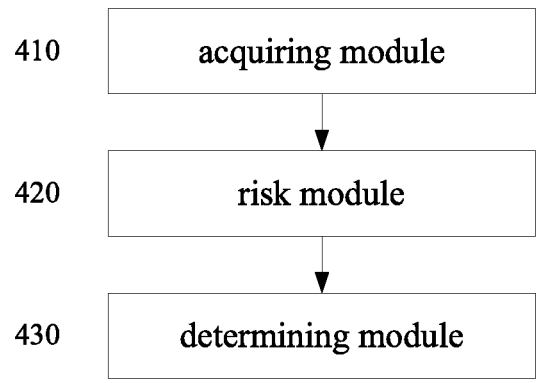
FIG. 4 shows a schematic block diagram of an apparatus used for living body detection according to an embodiment of the present disclosure.

As shown in FIG. 4, the apparatus 400 comprises an acquiring module 410, a risk module 420 and a determining module 430. The respective modules can perform respective functions/functions of the method for living body detection as described above. Only major functions of respective components of the apparatus 400 are described below, while detailed content having been described above are omitted.

The acquiring module 410 is configured to acquire device information of a terminal, wherein the terminal is used to acquire an image of an object to be detected. The acquiring module 410 can be implemented in a way that the processor 102 in the electronic device as shown in FIG. 1 runs program instructions stored in the storage device 104.

The risk module 420 is configured to determine a device risk level of the terminal by utilizing the device information of the terminal. The risk module 420 can be realized in a way that the processor 102 in the electronic device as shown in FIG. 1 runs the program instructions stored in the storage device 104.

Optionally, the risk module 420 can further comprise a virtual machine determining unit. The virtual machine determining unit determines whether the terminal is a virtual machine according to the device information of the terminal, wherein the device risk level of the virtual machine is a high risk level. Optionally, the device information comprises one or more of: device fingerprint, information on device electric energy information and information on device sensor. Optionally, the device sensor comprises one or more of: gyro sensor, gravity sensor, acceleration sensor and magnetic sensor.

Optionally, the device information comprises the device fingerprint. The risk module 420 can further comprise a blacklist determining unit. The blacklist determining unit determines that the device risk level of the terminal is a high risk level if the device fingerprint of the terminal belongs to the device fingerprint high risk blacklist library, and determines that the device risk level of the terminal is a risk level if the device fingerprint of the terminal belongs to the device fingerprint risk blacklist library.

Optionally, the device information comprises information on an abnormal accessing number of the terminal, and the risk module 420 can further comprise an abnormal accessing determining unit. The abnormal accessing determining unit determines that the device risk level of the terminal is the high risk level if the abnormal accessing number of the terminal is greater than the first threshold, and determines that the device risk level of the terminal is the risk level if the abnormal accessing number of the terminal is not greater than the first threshold but greater than a second threshold.

The determining module 430 is configured to determine a living body detection strategy based on the device risk level of the terminal. The determining module 430 can be implemented in a way that the processor 102 in the electronic device as shown in FIG. 1 runs the program instructions stored in the storage device 104.

Optionally, the determining module 430 determines that the living body detection strategy is a refusal strategy if the device risk level of the terminal is the high risk level.

Optionally, the determining module 430 determines that the living body detection strategy is to randomly increase the number of actions required to be performed by the object to be detected and/or raise the difficulty of actions required to be performed by the object to be detected if the device risk level of the terminal is the risk level, and/or determines that the living body detection strategy is to randomly decrease the number of actions required to be performed by the object to be detected and/or reduce the difficulty of actions required to be performed by the object to be detected if the device risk level of the terminal is neither the high risk level nor the risk level.

Those ordinary skilled in the art could recognize that by combining with units and algorithm steps of respective examples described in the embodiments disclosed in the text, it is capable of being implemented by an electronic hardware or a combination of a computer software and the electronic hardware. Whether these functions are implemented in a manner of a hardware or in a manner of a software depends on specific application and design constraint conditions of the technical solutions. Professional technicians can use different methods for each specific application to implement the described functions, but such implementation shall not be deemed as going beyond the scope of the present disclosure.

FIG. 5 shows a schematic block diagram of a system 500 used for living body detection according to an embodiment of the present disclosure. As shown in FIG. 5, the system 500 comprises an input device 510, a storage device 520, a processor 530 and an output device 540.

The input device 510 is configured to receive an operation instruction input by a user and collect data. The input device 510 can comprise one or more of a keyboard, a cursor mouse, a microphone, a touch screen and an image acquiring device.

The storage device 520 stores a computer program instruction used to realize corresponding steps in the living body detection method according to the embodiment of the present disclosure.

The processor 530 is configured to run the computer program instruction stored in the storage device 520, to perform corresponding steps of the living body detection method according to the embodiment of the present disclosure, and is configured to implement the acquiring module 410, the risk module 420 and the determining module 430 in the apparatus used for living body detection according to the embodiment of the present disclosure.

In one embodiment, the computer program instruction enables the system 500 to perform following steps when being ran by the processor 530: acquiring device information of the terminal, wherein the terminal is used to acquire an image of an object to be detected; determining a device risk level of the terminal by utilizing the device information of the terminal; and determining a living body detection strategy based on the device risk level of the terminal.

In one embodiment, the computer program instruction enables the system 500 to perform the following step when being ran by the processor 530: determining whether the terminal is a virtual machine according to the device information of the terminal, wherein the device risk level of the virtual machine is a high risk level.

Exemplarily, the device information comprises one or more of: device fingerprint, information on device electric energy and information on device sensor.

Exemplarily, the device sensor comprises one or more of: gyro sensor, gravity sensor, acceleration sensor and magnetic sensor.

In one embodiment, the device information comprises the device fingerprint, and the computer program instruction enables the system to perform following steps when being ran by the processor 530: determining that the device risk level of the terminal is a high risk level if the device fingerprint of the terminal belongs to a device fingerprint high risk blacklist library; and/or determining that the device risk level of the terminal is a risk level if the device fingerprint of the terminal belongs to the device fingerprint risk blacklist library.

In one embodiment, the device information comprises information on an abnormal accessing number of the terminal, and the computer program instruction enables the system 500 to perform following steps when being ran by the processor 530: determining that the device risk level of the terminal is the high risk level if the abnormal accessing number of the terminal is greater than the first threshold; and/or determining that the device risk level of the terminal is the risk level if the abnormal accessing number of the terminal is not greater than the first threshold but greater than a second threshold.

In an embodiment, the computer program instruction enables the system 500 to perform the following step when being ran by the processor 530: determining that the living body detection strategy is a refusal strategy if the device risk level of the terminal is the high risk level.

In an embodiment, the computer program instruction enables the system 500 to perform following steps when being ran by the processor 530: determining that the living body detection strategy is to randomly increase the number of actions required to be performed by the object to be detected and/or raise the difficulty of actions required to be performed by the object to be detected if the device risk level of the terminal is the high risk level, and/or determining that the living body detection strategy is to randomly decrease the number of actions required to be performed by the object to be detected and/or reduce the difficulty of actions required to be performed by the object to be detected if the device risk level of the terminal is neither the high risk level nor the risk level.

Figure 6:
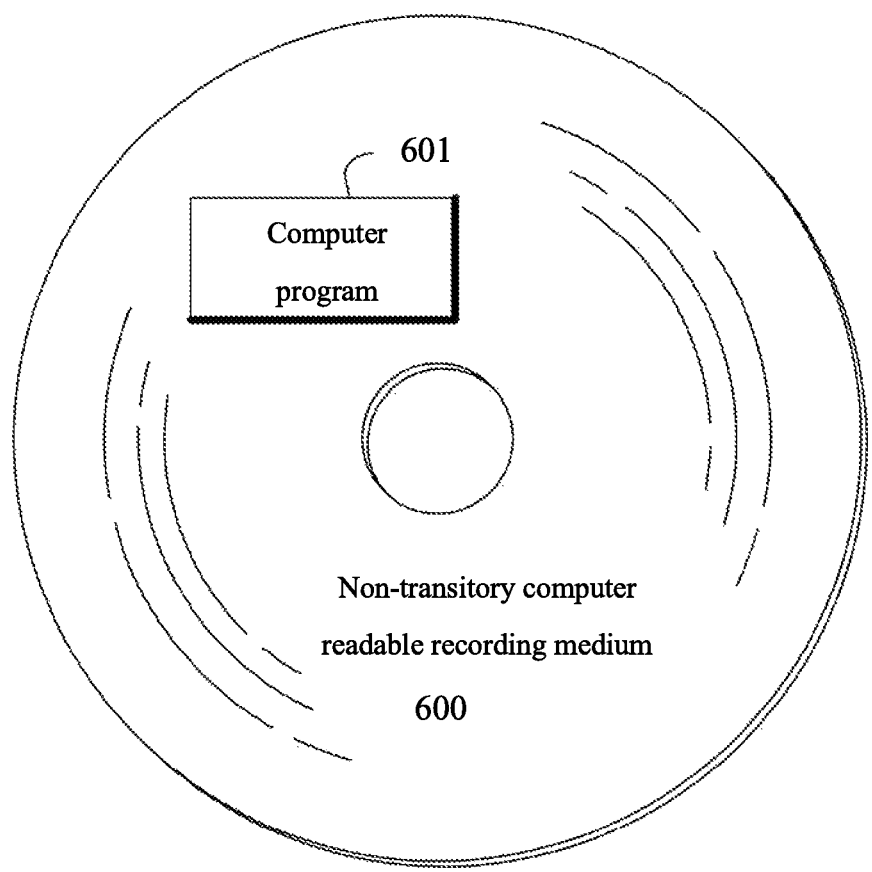
FIG. 6 shows a schematic diagram of a non-transitory computer readable recording medium according to an embodiment of the present disclosure.

Additionally, as shown in FIG. 6 according to another embodiment of the present disclosure, there is further provided a non-transitory computer readable recording medium 600 upon which a computer program 601 is stored. The computer program 601 enables a computer or a processor to perform corresponding steps of the living body detection method according to the embodiment of the present disclosure when being ran by the computer or the processor, and is used to implement corresponding modules in the apparatus used for living body detection according to the embodiment of the present disclosure. The storage medium can comprise for example, a storage card of an intelligent card, a storage means of a panel computer, a hard disk of a personal computer, a read-only-memory (ROM), an erasable programmable read-only memory (EPROM), a compact disc read-only memory (CD-ROM), a USB storage, or any combination of the above storage medium. The computer readable storage medium can be a random combination of one or more computer readable storage medium.

In one embodiment, the computer program instruction enables a computer or a processor to perform following steps when being ran by the computer or the processor: acquiring device information of a terminal, wherein the terminal is used to acquire an image of an object to be detected; determining a device risk level of the terminal by utilizing the device information of the terminal; and determining a living body detection strategy based on the device risk level of the terminal.

In one embodiment, the computer program instruction enables the computer or the process to perform the following step when being ran by the computer or the processor: determining whether the terminal is a virtual machine according to the device information of the terminal, wherein the device risk level of the virtual machine is a high risk level.

Exemplarily, the device information comprises one or more of: device fingerprint, information on device electric energy and information on device sensor.

Exemplarily, the device comprises one or more of: gyro sensor, gravity sensor, acceleration sensor and magnetic sensor.

In one embodiment, the device information comprises the device fingerprint, and the computer program instruction enables the computer or the processor to perform following steps when being performed by the computer or the processor: determining that the device risk level of the terminal is a high risk level if the device fingerprint of the terminal belongs to a device fingerprint high risk blacklist library; and/or determining that the device risk level of the terminal is a risk level if the device fingerprint of the terminal belongs to the device fingerprint risk blacklist library.

In one embodiment, the device information comprises information on an abnormal accessing number of the terminal, and the computer program instruction enables the computer or the processor to perform following steps when being ran by the computer or the processor: determining that the device risk level of the terminal is the high risk level if the abnormal accessing number of the terminal is greater than the first threshold; and/or determining that the device risk level of the terminal is the risk level if the abnormal accessing number of the terminal is not greater than the first threshold but greater than a second threshold.

In an embodiment, the computer program instruction enables the computer or the processor to perform the following step when being ran by the computer or the processor: determining that the living body detection strategy is a refusal strategy if the device risk level of the terminal is the high risk level.

In an embodiment, the computer program instruction enables the computer or the processor to perform following steps when being ran by the computer or the processor: determining that the living body detection strategy is to randomly increase the number of actions required to be performed by the object to be detected and/or raise the difficulty of actions required to be performed by the object to be detected if the device risk level of the terminal is the high risk level, and/or determining that the living body detection strategy is to randomly decrease the number of actions required to be performed by the object to be detected and/or reduce the difficulty of actions required to be performed by the object to be detected if the device risk level of the terminal is neither the high risk level nor the risk level.

The living body detection method, apparatus, system, and non-transitory recording medium according to the embodiment of the present disclosure perform the living body detection strategy by utilizing the device information of the terminal, which guarantee a true living body to go through a pass of the detection at a smaller cost, and at the same time makes it difficult for a false and evil living body to go through a pass of the detection. In this way, security risk of the living body detection is greatly reduced, the user experience is enhanced, and occupation of system resourced by an evil request is prevented.

Although exemplary embodiments have been described by referring to the accompanying figures, it shall be understood that the above exemplary embodiments are just for illustration but do not intend to limit the scope of the present disclosure. Those ordinary skilled in the art can make various alternations and amendments without departing from the scope and spirit of the present disclosure. All these alternations and amendments intend to be included within the scope of the present disclosure as claimed in the attached Claims.

Those ordinary skilled in the art could recognize that by combining with units and algorithm steps of respective examples described in the embodiments disclosed in the text, it is capable of being implemented by an electronic hardware or a combination of a computer software and the electronic hardware. Whether these functions are implemented in a manner of a hardware or in a manner of a software depends on specific application and design constraint conditions of the technical solutions. Professional technicians can use different methods for each specific application to implement the described functions, but such implementation shall not be deemed as going beyond the scope of the present disclosure.

In the several embodiments provided by the present application, it shall be understood that the disclosed devices and methods can be implemented in other manners. For example, the apparatus embodiments described above are just for illustration, for example, division of the units is just a logical function division, and there may be additional manners of division in the actual implementation, for example, a plurality of units or components can be combined or can be integrated into another device, or some features may be omitted, or not performed.

In the specification provided herein, a large amount of specific details are described. However, it is capable of understanding that the embodiments of the present disclosure can be applied without these specific details. In some embodiments, the commonly known methods, structures and techniques are not showed in detail, for the purpose of not blurring the understanding of the present specification.

Likewise, it shall be understood that in order to simplify the present disclosure and help to understand one or more of respective inventive aspects, in the description of exemplary embodiments of the present disclosure, respective features of the present disclosure are sometimes grouped together into a single embodiment, figure or description thereof. However, the method of the present disclosure shall not be explained to reflect the following intention: the present disclosure sought for protections seeks protection for more features than the features explicitly recited in each claim. To be more exact, as reflected in the corresponding Claims, its inventive point lies in that features less than all the features of a single embodiment disclosed herein can be used to solve a corresponding technical problem. Therefore, the Claims keeping to a specific implementation are thus explicitly incorporated into this specific implementation, wherein each claim per se is taken as a separate embodiment of the present disclosure.

Those skilled in the art can understand that except the features being mutually exclusive, any combination can be adopted to combine all the features disclosed in the present specification (including the attached Claims, abstract and figures) and all processors or units of any method or device disclosed in this way. Unless otherwise explicitly stated, each feature disclosed in the present specification (including the attached Claims, abstract and figures) can be replaced with an alternative feature that gives same, equivalent or similar purposes.

Additionally, those skilled in the art are able to understand that, although some embodiments described herein comprise certain features instead of other features included in other embodiments, combination of features of different embodiments means to fall into the scope of the present disclosure and form a different embodiment. For example, in the Claims, any one of embodiments sought for protection can be used in any way of combination.

Respective component embodiments of the present disclosure can be implemented by a hardware, or can be implemented by a software ran upon one or more processor, or can be implemented by a combination thereof. Those skilled in the art shall understand that some or all the functions of some modules in the apparatus used for living body detection according to the embodiments of the present disclosure can be implemented by using a micro-processor or a digital signal processor (DSP) in practice. The present disclosure can be further implemented by an apparatus program (for example, computer program and computer program product) used to perform a part or all of the method described herein. Such program implementing the present disclosure can be stored in a computer readable medium, or can be a form having one or more signals. Such signal can be downloaded from the Internet site, or can be provided on a carrier signal, or can be provided in other forms.

It shall be noted that the above embodiments are description about the present disclosure but not limitation to the present disclosure, and those skilled in the art can design alternative embodiments without departing from the scope of the attached Claims. In the claims, any reference symbol inside the parentheses shall not be drafted as a limitation to the claims. The word "include" does not exclude that there are elements or steps not listed in the claims. The word "one" or "a" prior to an element does not exclude that there are a plurality of these elements. The present disclosure can be realized by means of a hardware including several different elements and by means of an appropriately programmed computer. In a unit claim having listed several devices, several of these devices can be specifically implemented by a same hardware. The use of words such as first, second and third and so on does not indicate any sequence. These words can be explained as names.

The above descriptions are just specific implementations or specification of the specific implementations of the present disclosure. The protection scope of the present disclosure is not limited thereto. Any alternation or replacement that can be easily conceived by those skilled in the art who are familiar with the technical field shall be covered within the protection scope of the present disclosure. The protection scope of the present disclosure shall be subject to the protection scope of the Claims.

What is claimed is:

1. A living body detection method, comprising:
    acquiring device information of a terminal, wherein the terminal is used to acquire an image of an object to be detected;
    determining a device risk level of the terminal by utilizing the device information of the terminal; and
    determining a living body detection strategy based on the device risk level of the terminal, wherein the device information comprises information on an abnormal accessing number of the terminal, and the determining a device risk level of the terminal by utilizing the device information of the terminal comprises:

determining that the device risk level of the terminal is a high risk level if the abnormal accessing number of the terminal is greater than a first threshold;

determining that the device risk level of the terminal is a risk level if the abnormal accessing number of the terminal is not greater than the first threshold but greater than second threshold, wherein the determining a living body detection strategy based on the device risk level of the terminal comprises;

determining that the living body detecting strategy is to randomly combine increasing the number of actions required to be performed by the object to be detected and raising the difficulty of actions required to be performed by the object to be detected if the device risk level of the terminal is a risk level;

determining that the living body detecting strategy is to randomly combine decreasing the number of actions required to be performed by the object to be detected and decreasing the difficulty of actions required to be performed by the object to be detected if the device risk level of the terminal is neither a high risk level nor a risk level.

2. The method according to claim 1, wherein the determining a device risk level of the terminal by utilizing the device information of the terminal comprises:

determining whether the terminal is a virtual machine according to the device information of the terminal, wherein a device risk level of the virtual machine is a high risk level.

3. The method according to claim 2, wherein the device information comprises one or more of:

a device fingerprint, information on device electric energy, or information on device sensor.

4. The method according to claim 3, wherein the device sensor comprises one or more of:

a gyroscope sensor, a gravity sensor, an acceleration sensor, or a magnetic sensor.

5. The method according to claim 1, wherein the device information comprises a device fingerprint, and the determining a device risk level of the terminal by utilizing the device information of the terminal comprises:

determining that the device risk level of the terminal is a high risk level if the device fingerprint of the terminal belongs to a device fingerprint high risk blacklist library; or determining that the device risk level of the terminal is a risk level if the device fingerprint of the terminal belongs to a device fingerprint risk blacklist library.

6. The method according to claim 2, wherein the determining a living body detection strategy based on the device risk level of the terminal comprises:

determining that the living body detection strategy is a refusal strategy if the device risk level of the terminal is a high risk level.

7. A system for living body detection, comprising:
a processor; and
a storage;
wherein a computer program instruction is stored in the storage, and the computer program instruction is used to perform a living body detection method when being ran by the processor, wherein the living body detection method comprises:

acquiring device information of a terminal, wherein the terminal is used to acquire an image of an object to be detected, determining a device risk level of the terminal by utilizing the device information of the terminal, and determining a living body detection strategy based on the device risk level of the terminal, wherein the device information comprises information on an abnormal accessing number of the terminal, and the determining a device risk level of the terminal by utilizing the device information of the terminal when the computer program instruction being ran by the processor comprises:

determining that the device risk level of the terminal is a high risk level if the abnormal accessing number of the terminal is greater than a first threshold;

determining that the device risk level of the terminal is a risk level if the abnormal accessing number of the terminal is not greater than the first threshold but greater than a second threshold, wherein the determining a living body detection strategy based on the device risk level of the terminal when the computer program instruction being ran by the processor comprises:

determining that the living body detecting strategy is to randomly combine increasing the number of actions required to be performed by the object to be detected and raising the difficulty of actions required to be performed by the object to be detected if the device risk level of the terminal is a risk level;

determining that the living body detecting strategy is to randomly combine decreasing the number of actions required to be performed by the object to be detected and decreasing the difficulty of actions required to be performed by the object to be detected if the device risk level of the terminal is neither a high risk level nor a risk level.

8. The system for living body detection according to claim 7, wherein the determining a device risk level of the terminal by utilizing the device information of the terminal when the computer program instruction being ran by the processor comprises:

determining whether the terminal is a virtual machine according to the device information of the terminal, wherein a device risk level of the virtual machine is a high risk level.

9. The system for living body detection according to claim 8, wherein the device information comprises one or more of:

a device fingerprint, information on device electric energy, or information on device sensor.

10. The system for living body detection according to claim 9, wherein the device sensor comprises one or more of: a gyroscope sensor, a gravity sensor, an acceleration sensor, or a magnetic sensor.

11. The system for living body detection according to claim 7, wherein the device information comprises a device fingerprint, and the determining a device risk level of the terminal by utilizing the device information of the terminal when the computer program instruction being ran by the processor comprises:

determining that the device risk level of the terminal is a high risk level if the device fingerprint of the terminal belongs to a device fingerprint high risk blacklist library, or determining that the device risk level of the terminal is a risk level if the device fingerprint of the terminal belongs to a device fingerprint risk blacklist library.

12. The system for living body detection according to claim 8, wherein the determining a living body detection strategy based on the device risk level of the terminal when the computer program instruction being ran by the processor comprises:
determining that the living body detection strategy is a refusal strategy if the device risk level of the terminal is a high risk level.

13. A non-transitory computer-readable recording medium on which a computer program is stored, wherein the computer program is used to perform a living body detection method when being ran, the living body detection method comprising:
acquiring device information of a terminal, wherein the terminal is used to acquire an image of an object to be detected;
determining a device risk level of the terminal by utilizing the device information of the terminal; and
determining a living body detection strategy based on the device risk level of the terminal,
wherein the device information comprises information on an abnormal accessing number of the terminal, and the determining a device risk level of the terminal by utilizing the device information of the terminal when the computer program being ran comprises:
determining that the device risk level of the terminal is a high risk level if the abnormal accessing number of the terminal is greater than a first threshold;
determining that the device risk level of the terminal is a risk level if the abnormal accessing number of the terminal is not greater than the first threshold but greater than a second threshold,
wherein the determining a living body detection strategy based on the device risk level of the terminal comprises:
determining that the living body detecting strategy is to randomly combine increasing the number of actions required to be performed by the object to be detected and raising the difficulty of actions required to be performed by the object to be detected if the device risk level of the terminal is a risk level;
determining that the living body detecting strategy is to randomly combine decreasing the number of actions required to be performed by the object to be detected and decreasing the difficulty of actions required to be performed by the object to be detected if the device risk level of the terminal is neither a high risk level nor a risk level.

14. The non-transitory computer-readable recording medium according to claim 13, wherein the determining a device risk level of the terminal by utilizing the device information of the terminal when the computer program being ran comprises:
determining whether the terminal is a virtual machine according to the device information of the terminal, wherein a device risk level of the virtual machine is a high risk level,
wherein the device information comprises one or more of: a device fingerprint, information on device electric energy, or information on device sensor, and
wherein the device sensor comprises one or more of: a gyroscope sensor, a gravity sensor, an acceleration sensor, or a magnetic sensor.

15. The non-transitory computer-readable recording medium according to claim 13, wherein the device information comprises a device fingerprint, and the determining a device risk level of the terminal by utilizing the device information of the terminal when the computer program being ran comprises:
determining that the device risk level of the terminal is a high risk level if the device fingerprint of the terminal belongs to a device fingerprint high risk blacklist library; or
determining that the device risk level of the terminal is a risk level if the device fingerprint of the terminal belongs to a device fingerprint risk blacklist library.

* * * * *